United States Patent Office 2,865,494
Patented Dec. 23, 1958

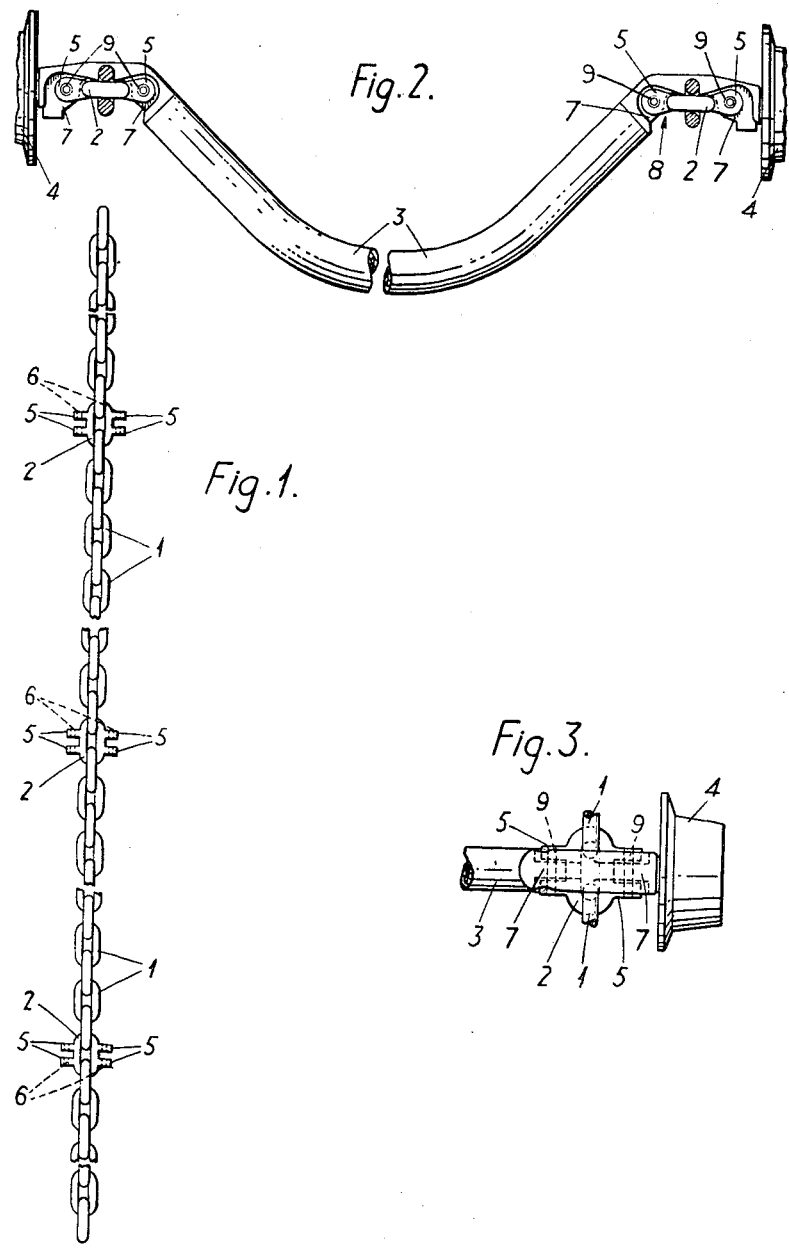

2,865,494

CHAIN DRIVEN BELT CONVEYORS

Angus W. Duncan, Worcester, England, assignor to The Mining Engineering Company Limited, Worcester, England Application July 19, 1956, Serial No. 598,900

Claims priority, application Great Britain August 8, 1955

3 Claims. (Cl. 198—191)

This invention relates to conveyors of the kind comprising a load-carrying element e. g. an endless belt, carried by cross-members connected between chains through which the load-carrying element is driven, the chains with the cross-members forming a separate tension element. Such conveyors are described in our co-pending applications Nos. 387,958, now Patent No. 2,821,290, and 388,719, now abandoned.

Further in our co-pending application No. 397,680, now abandoned, there is described an assembly for conveyor of the above kind comprising a cross member and rollers for engaging a guide track to support and guide the tension element in which links connecting lengths of said chains are interposed between the cross-member and the rollers and form part of that assembly.

It is, in practice, not always convenient that the cross members should necessarily be associated with the joining links of standard lengths of chain.

The object of this invention is to provide a tension medium for conveyors of the kind referred to comprising cable link chains in lengths of at least two cross member spacings with closed links at intervals adapted to receive cross members by quickly detachable means, so that cross members may be connected into or removed from the chains without disturbing the tension member as such.

With the above object in view the invention, from one aspect, provides a tension member for conveyors of the kind referred to comprising a number of separate standard lengths of chain, joining links for the interconnection of these standard lengths and certain special closed links incorporated in those lengths having easily detachable means for connection to a cross member and guide roller assembly.

From another aspect the invention provides, in a conveyor of the kind referred to, a tension member comprised by an endless loop of cable link chain made up of one or more lengths of such chain interconnected by one or more joining links and closed links spaced at appropriate distances which are provided with quickly releasable means for their attachment to cross members and guide roller assemblies.

From yet another aspect the invention provides, for a cable chain tension element for a conveyor of the kind referred to, certain closed links having permanently fixed thereto or integral therewith appropriately extending lugs or the like for the reception of quickly releasable means for connecting them to cross member and guide roller assemblies whereby such assemblies may be interchanged without disturbing the tension capacity of the chain.

In some preferred forms of the invention the links for connection to the cross member assemblies are closed castings or forgings with a pair of parallel lugs extending from both straight sides of the link; these are introduced into lengths of chain before heat treatment and stretching to correct pitch.

In other preferred forms of the invention the special links are provided with a pair of parallel lugs on both straight sides which are jig welded to otherwise standard links before heat treatment and stretching.

The special links are arranged as horizontal (that is parallel to the cross members) links in the chain as also are the joining links.

Through holes may be provided in both pairs of lugs on a special link for its attachment by split dowels to a pair of vertical flats formed near the end of a cross member assembly.

Since the special links are unbroken and their connections to cross member assemblies is by quickly releasable means, it will be clear that cross member can be removed and replaced without affecting the tension capacity of the chain.

The above and other parts of the invention are embodied in one preferred form which will now be described in more detail by way of example with reference to the accompanying drawing in which—

Fig. 1 is a plan view of a length of cable link chain,
Fig. 2 is a side view of a cross member of a conveyor showing its connection to the chain and
Fig. 3 is a plan view of one end of the cross member shown in Fig. 2.

As shown in Fig. 1, the chain comprises lengths of conventional links 1 with certain special links 2.

A standard length of chain for incorporation in an endless loop forming the tension medium of a conveyor of the kind above referred to comprises a total of 83 links of 2" pitch.

Three of these links are of special form 2, and one of them forms the centre link of the chain. The other two special links are separated from the central one by 27 standard links 1 and are both connected at their outer ends to 13 standard links.

The number of standard links in the end sections of standard length chain must always be half the number of links between the special links minus one link and the number of links between special links must be odd to maintain equal spacing of special links, and, hence of cross members when similar lengths of chain are connected together.

The special links 2 are for connection to assemblies of cross member 3 and guide roller 4 which support a carrying belt. The links 2 each have a pair of lugs 5 projecting outwardly from their flat sides in parallel relationship and through holes 6 are provided in alignment through both pairs of lugs.

Inwardly directed pairs of flats 7 are provided in a recessed portion 8 at each end of each cross member, and these flats 7 are received within the pairs of lugs 5 on the special links. The end of the cross member spans the special link which lies within the recess 8. The rollers 4 are rotatably mounted on the extreme ends of the cross member 3.

The flats 7 are a good working fit between the pairs of lugs 5 and are drilled to receive split dowels 9 which pass also through the holes 6 in the lugs.

Connecting links between lengths of chain are horizontal links and may be of any known type.

It will be understood that the invention can be put into effect in a number of ways characterised by the incorporation in the chains of closed links adapted to receive cross members attached by quickly releasable means without affecting the tension capacity of the chain.

What I claim is:

1. In a conveyor including an endless belt supported on and tensioned by cranked carrier members between cable link chains, the combination comprising cable link chains which may be driven by sprockets, spaced intermediate links in said chains of one-piece construction, carrier members disposed between transversely aligned intermediate links for supporting and tensioning said belt, rollers on the ends of the carrier members for supporting the latter, spanning portions on said carrier members adjacent said rollers for overlying said links, said intermediate links having a pair of lugs extending from each side, the lugs of each pair being spaced and parallel to each other and extending at right angles to the chains, projecting ends on said spanning portions received between said pairs of lugs, and means to rigidly connect said ends and said lugs so that said chains depend from said carrier members and transmit torque thereto without supporting the load on the conveyor belt.

2. In a conveyor including an endless belt supported on and tensioned by cranked carrier members between cable link chains, the combination comprising cable link chains which may be driven by sprockets, each cable link chain being of a length equal to at least the distance between successive carrier members, spaced intermediate links joining said lengths to form an endless chain and of one-piece construction, each of said lengths of chain including at least two intermediate links spaced so that the number of chain links between an intermediate link and the end of the length of chain is equal to half the number between intermediate links less one, carrier members disposed between transversely aligned intermediate links for supporting and tensioning said belt, rollers on the ends of the carrier members for supporting the latter, spanning portions on the ends of said carrier members adjacent said rollers for overlying said links, said intermediate links having a pair of lugs extending from each side, the lugs of each pair being spaced and parallel to each other and extending at right angles to the chains, projecting ends on said spanning portions received between said pairs of lugs, and means to rigidly connect said ends and said lugs so that said chains depend from said carrier members and transmit torque thereto without supporting the load on the conveyor belt.

3. The combination of claim 1 wherein said rigidly connecting means also detachably connects said ends and said lugs so that said carrier members may be readily added to or removed from the chains.

References Cited in the file of this patent

UNITED STATES PATENTS

| | | |
|---|---|---|
| 2,260,591 | Thurston et al. | Oct. 28, 1941 |

FOREIGN PATENTS

| | | |
|---|---|---|
| 662,522 | Germany | July 15, 1938 |
| 1,059,196 | France | Nov. 10, 1953 |